E. M. Query,
Subsoil Plow.
No. 105,844. Patented July 26, 1870.
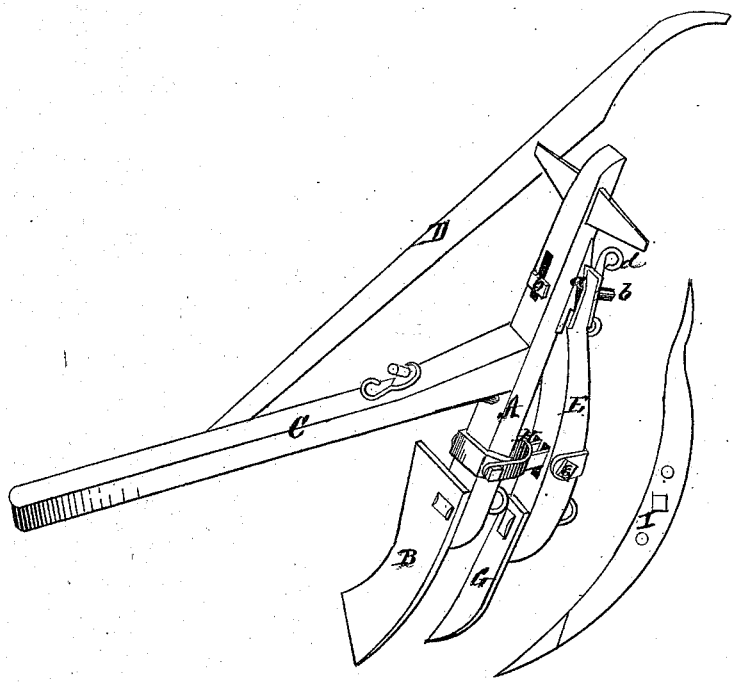

UNITED STATES PATENT OFFICE.

ELAM M. QUERY, OF HARRIS DEPOT, NORTH CAROLINA.

IMPROVEMENT IN SUBSOIL-PLOWS.

Specification forming part of Letters Patent No. 105,844, dated July 26, 1870.

*To all whom it may concern:*

Be it known that I, ELAM M. QUERY, of Harris Depot, in the county of Cabarrus, and in the State of North Carolina, have invented certain new and useful Improvements in Subsoil-Plows; and I do hereby declare that the following is a full, clear, and exact description thereof, reference being had to the accompanying drawing, and to the letters of reference marked thereon, making a part of this specification.

The nature of my invention consists in the construction and arrangement of a subsoil-plow, as will be hereinafter fully described.

In order to enable others skilled in the art to which my invention appertains to make and use the same, I will now proceed to describe its construction and operation, referring to the annexed drawing, which represents a perspective view of my invention.

A represents the usual plow-stock, with the plow B attached at its lower end. C is the plow-beam, and D the handles.

On the rear side of the plow-stock A is affixed a ratchet-bar, $a$, near the upper end, and a wooden subsoil-plow beam, E, is attached by means of a bolt, $b$, which is passed through a slot in the plow-stock A and the ratchet-plate $a$. The bolt $b$ then passes through a hole in the beam E, and is secured by a thumb-nut, $d$. The upper front corner of the beam E is metal-shod, and bears against one of the teeth of the ratchet-plate $a$, and can be raised or lowered at will, so that the subsoil-plow G, secured at the lower end of the beam E, may work at any depth desired.

At a suitable point on the plow-stock A is attached a clevis, H, which passes through slots in the beam E, and is there pivoted by means of a bolt, $e$, passing through the same.

The wooden beam E and subsoil-plow G are intended to be used where there is no pipe-clay; but where there is pipe-clay I substitute a subsoiler, I, made entirely of iron. These two can be readily interchanged.

This plow can not only be used a subsoiler, but also to prepare the land and work the crop. A cotton or corn planter may be readily attached, as also a fertilizer-distributer.

Having thus fully described my invention, what I claim as new, and desire to secure by Letters Patent, is—

The arrangement of the beam C, stock A, ratchet-plate $a$, bolt $b$, nut $d$, subsoil-beam E, and clevis H, all constructed and operated substantially as set forth.

In testimony that I claim the foregoing I have hereunto set my hand this 21st day of March, 1870.

ELAM M. QUERY.

Witnesses:
  CHAS. F. HARRIS.
  CHAS. A. CALDWELL.